(12) United States Patent
Munoz

(10) Patent No.: US 11,589,556 B2
(45) Date of Patent: Feb. 28, 2023

(54) ANIMAL RESTRAINT AND TRAINING DEVICE

(71) Applicant: Eric B. Munoz, Greer, SC (US)

(72) Inventor: Eric B. Munoz, Greer, SC (US)

( * ) Notice: Subject to any disclaimer, the term of this patent is extended or adjusted under 35 U.S.C. 154(b) by 54 days.

(21) Appl. No.: 17/376,658

(22) Filed: Jul. 15, 2021

(65) Prior Publication Data

US 2023/0019455 A1    Jan. 19, 2023

(51) Int. Cl.
*A01K 15/02* (2006.01)
*A01K 27/00* (2006.01)

(52) U.S. Cl.
CPC ............ *A01K 15/02* (2013.01); *A01K 27/005* (2013.01); *A01K 27/009* (2013.01)

(58) Field of Classification Search
CPC ..... A01K 15/02; A01K 27/005; A01K 27/009
See application file for complete search history.

(56) References Cited

U.S. PATENT DOCUMENTS

| | | |
|---|---|---|
| 2,289,802 A | 7/1942 | Norton |
| 4,787,340 A | 11/1988 | Kirtley |
| 5,456,213 A | 10/1995 | Beauchamp |
| 6,003,474 A * | 12/1999 | Slater ............... A01K 15/021 119/908 |
| D609,409 S | 2/2010 | Labelson et al. |
| 8,967,086 B2 | 3/2015 | Palladino |
| D877,990 S | 3/2020 | Lovett |
| 2013/0074782 A1 | 3/2013 | Marran |
| 2013/0269629 A1 | 10/2013 | Holt, Jr. |
| 2016/0095298 A1 | 4/2016 | Bodrie |
| 2017/0127653 A1 | 5/2017 | Fang |
| 2019/0059333 A1 * | 2/2019 | Lagarde ............ A01K 27/005 |

* cited by examiner

*Primary Examiner* — Monica L Perry
*Assistant Examiner* — Alanna K Peterson
(74) *Attorney, Agent, or Firm* — Kirk A. Wilson; Joseph T. Guy; Patent Filing Specialist Inc.

(57) ABSTRACT

A simpler and more humane animal restraint and training device, and a method of using the device, having magnetic members and locking teeth that prevents animal choking, retains contact between the two clasp portions to prevent collar loosening, and does not require the use of fine motor skills by the animal owner. Training signals can also be generated to teach proper gait for the animal as well as other training commands.

11 Claims, 6 Drawing Sheets

ANIMAL RESTRAINT AND TRAINING DEVICE

CROSS-REFERENCE TO RELATED APPLICATIONS

None

FIELD OF THE INVENTION

An animal restraint and training device and a method of using the device are disclosed. A simpler and more humane clasp is taught with magnetic members that prevents animal choking, retains contact between the two clasp portions to prevent collar loosening, and does not require the use of fine motor skills by the animal owner. Training signals can also be generated to teach proper gait for the animal as well as other training commands.

BACKGROUND

Animal restraint devices such as pet leashes and harnesses are well known, and are available in a wide variety of configurations and with many different features. Many of these known leashes and harnesses include one or both of a buckle for attaching the ends of adjacent straps together and a leash connector for securing a leash for lead to the collar or harness. The buckle provides a releasable mechanism for securing the leash or harness on an animal or the animal collar. The leash connector facilitates attachment of a leash typically associated with such leashes and harnesses by providing a convenient anchoring point for the hook or other connecting device provided on an end of the leash. The buckle and leash connectors are provided as separate components on known and available leashes and harnesses.

In certain instances, the leash or harness may include a traditional buckle having a pivoting prong that is received in one of several spaced holes in an end of a strap to be connected by the buckle. These buckles are effective at creating a desired length of the leash or harness strap, but can be difficult to use. Alternatively, quick release buckles may be provided on the leash or harness, which may include depressible side members that allow a first portion of the buckle to be removed from a second portion of the buckle. While these quick release buckles are somewhat effective at alleviating the deficiencies of the traditional buckle, they are generally not strong and therefore are not always acceptable on leashes and harnesses for most dogs.

Connectors are typically provided on leashes and harnesses in the form of an O ring or D ring that is secured to the webbing of the leash or harness during manufacturing. These leash connectors are effective at providing a connection point between the leash or harness and the leash, but they add complexity to the component and manufacturing costs of the products.

Many connectors also require significant manual dexterity to operate when connecting and disconnecting, sometimes beyond the ability of older and physically challenged people. For example, the traditional set-up type pet leash of the prior art has a hook trigger for attaching to an external collar, and the external collar has a ring for fastening to the hook trigger. If the owner wants to walk the dog, the owner must attach the hook trigger to the ring, to combine the traditional set-up type pet leash and the external collar which is sometimes beyond the ability of older and physically challenged owners.

Also, the British slip lead type pet leash of the prior art has a leash and a slip knot movably connected to the leash in a manner that applies a pet choking action when tension is used. The size of the collar will become smaller if the dog pulls too hard. Thus, the owner applies a choking action to the neck of the pet thereby potentially injuring the pet esophagus and causing the pet to 'gag'.

Furthermore, the semi slip lead type pet leash of the prior art has a leash and the size adjusting buckle that limits the movement of the slip knot, such that the collar can have a minimum size, but has no buckling ability to prevent loosening of the collar. Lastly, the Martingale type pet leash has a collar belt and a size adjusting belt fastened to the two ends of the collar belt such that when the dog pulls, the leash will tighten such that the size of the collar will become smaller, thereby potentially injuring the pet esophagus and causing the pet to 'gag'.

There is a need in the art for a simpler and more humane clasp for animal restraint and training devices that alleviates the use of fine motor skills and other deficiencies of the prior art.

SUMMARY OF THE INVENTION

An animal restraining clasp having a clasp distal portion with a distal magnet, the clasp distal portion being fixedly coupled to a strap distal end and slidingly coupled to a strap proximate portion. A mating clasp proximate portion with a proximate magnet is movably coupled to a strap distal portion. The sliding motion of the clasp distal portion is limited to traversal of only the strap proximate portion until tension in the strap stops motion of the clasp distal portion upon physical engagement with the clasp proximate portion and magnetic engagement between the proximate magnet and distal magnet, thereby magnetically coupling the clasp proximate portion with the clasp distal portion.

Also disclosed is an animal restraint and training device having a strap having a strap proximate portion with a strap proximate end, and a strap distal portion with a strap distal end. The device has a clasp with a clasp distal portion having a distal magnet, the clasp distal portion being fixedly coupled to the strap distal end and slidingly coupled to the strap proximate portion. A mating clasp proximate portion having a proximate magnet, is movably coupled to the strap distal portion. The sliding motion of the clasp distal portion is limited to traversal of only the strap proximate portion until tension in the strap stops motion of the clasp distal portion upon physical engagement with the coupled clasp proximate portion and magnetic engagement between the proximate magnet and distal magnet, thereby magnetically coupling the clasp proximate portion with the clasp distal portion.

A method of restraining an animal with a strap and clasp is disclosed as having the steps of: movably coupling a clasp proximate portion, having a proximate magnet, onto a strap distal portion in an animal non-choking position corresponding with a limited strap lasso diameter, wherein the strap distal portion is defined as the strap portion disposed on the distal side of the clasp proximate portion and the strap proximate portion is defined as the strap portion disposed on the proximate side of the clasp proximate portion; sliding the clasp distal portion in the proximate direction thereby forming an expanded strap lasso diameter, the clasp distal portion sliding motion limited to traversal of only the strap proximate portion; placing the expanded strap lasso diameter over the head of an animal or onto an animal harness connection; applying strap tension to the strap proximate portion thereby forcing sliding motion of the clasp distal portion in the distal direction to reduce the expanded strap lasso diameter to a limited strap lasso diameter; physically engaging the clasp distal portion with the clasp proximate portion; magnetically coupling the clasp proximate portion with the clasp distal portion to maintain the clasp distal portion position at the limited strap lasso diameter, thereby generating a magnetic clasp coupling sound signaling the animal to proceed at this pace; restraining the animal at the limited strap lasso diameter position by applying tension to the strap proximate portion, thereby avoiding animal choking; applying additional tension to the strap proximate portion which pivots the clasp distal portion around the outer edge of the clasp proximate portion to temporarily decouple the distal magnet from the proximate magnet while retaining a minimum magnetic attraction between the proximate magnet and distal magnet thereby preventing the clasp distal portion from decoupling from the clasp proximate portion, while simultaneously making a magnetic clasp decoupling sound, signaling the animal to slow their pace; releasing strap tension to the strap proximate portion, thereby pivoting the clasp distal portion toward the clasp proximate portion to temporarily recouple the distal magnet to the proximate magnet and generate the magnetic clasp coupling sound signaling the animal to proceed at this pace; and freeing the animal by disengaging the magnetic coupling and sliding the clasp distal portion in the proximate direction until the expanded strap lasso diameter is sufficient to remove the strap from the animal head or harness.

DETAILED DESCRIPTION

Figure 1:
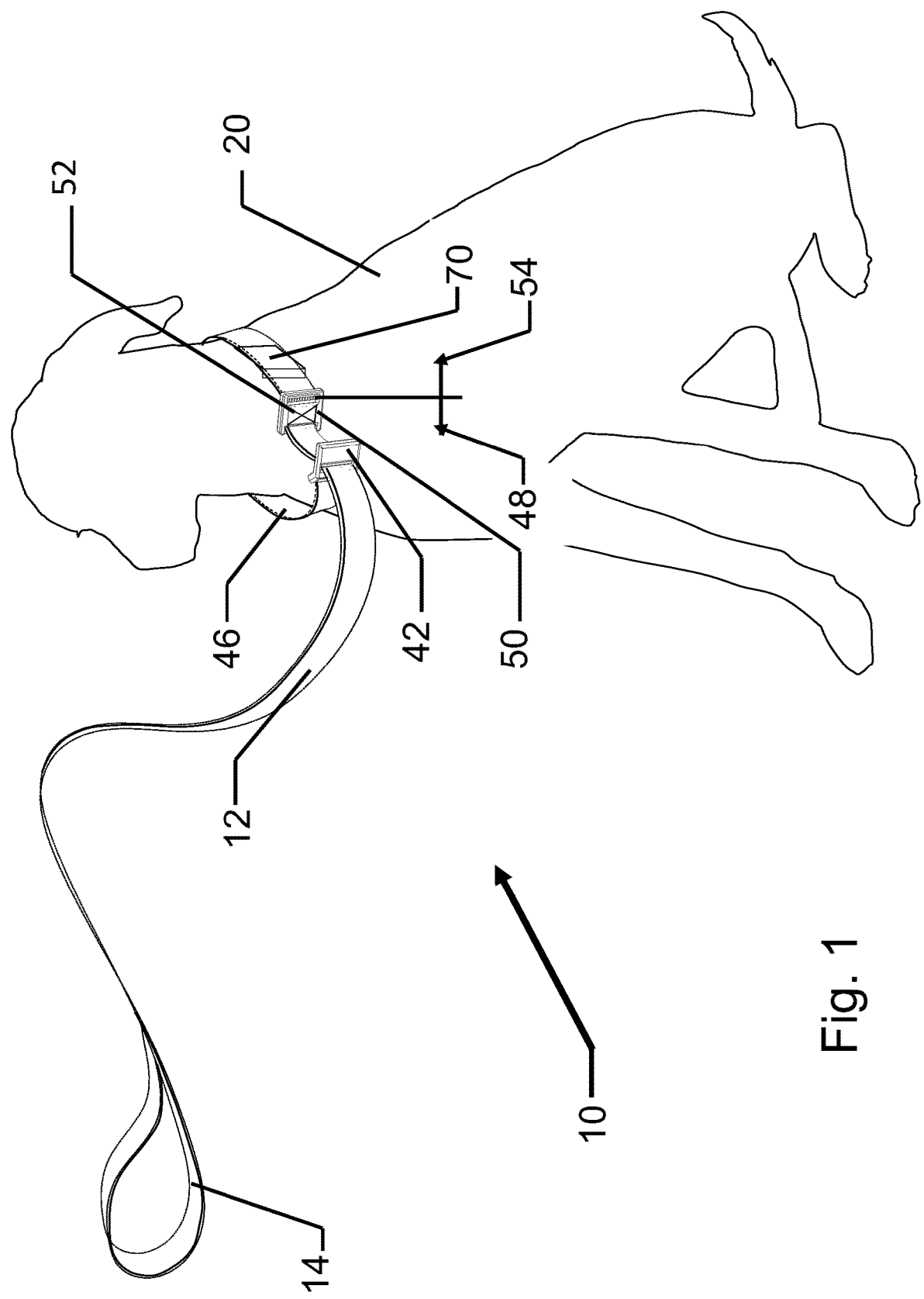
FIG. 1 shows an embodiment of the animal restraint and training device.
Figure 2:
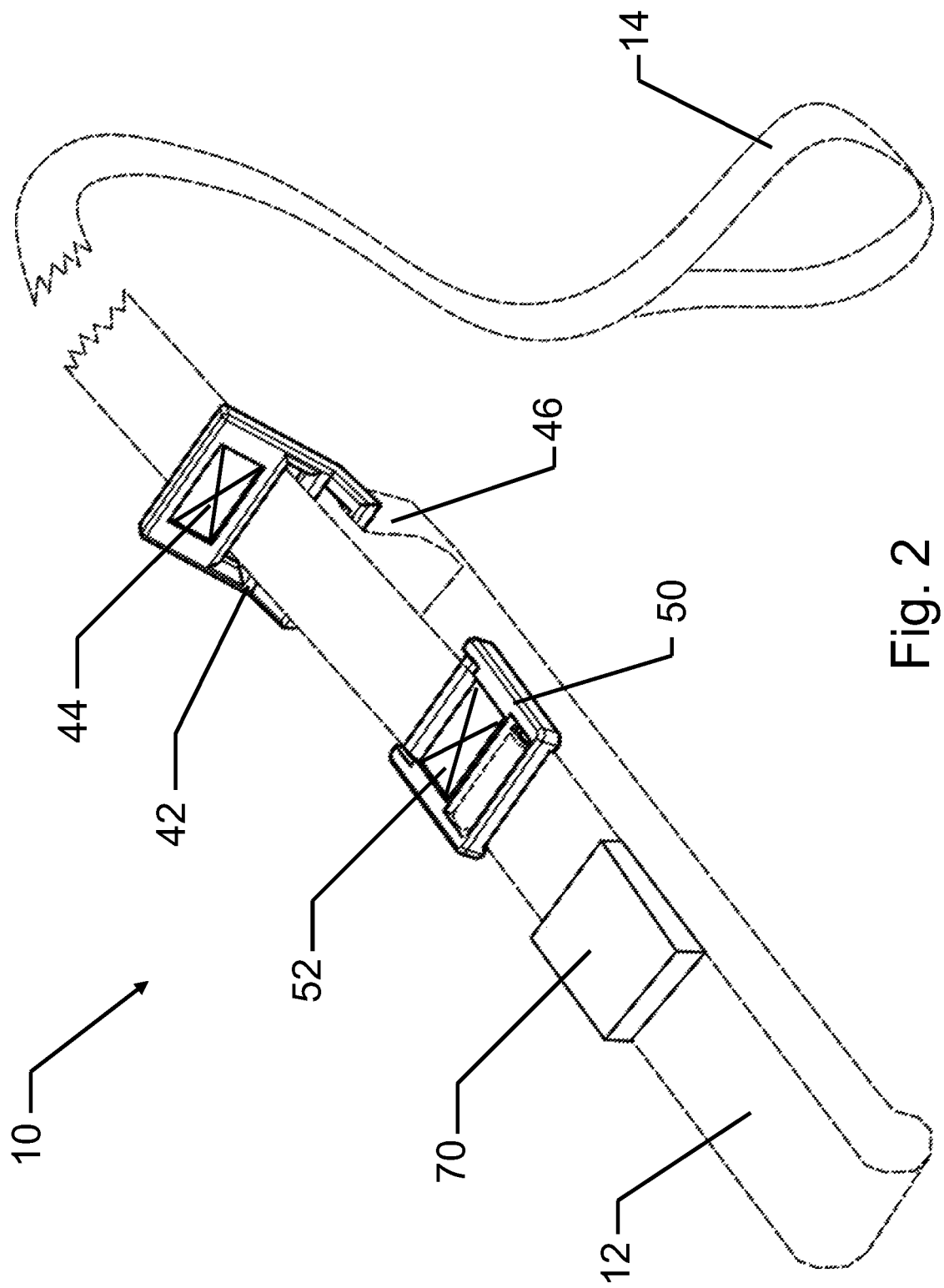
FIG. 2 shows some major components of the animal restraint and training device.
Figure 3:
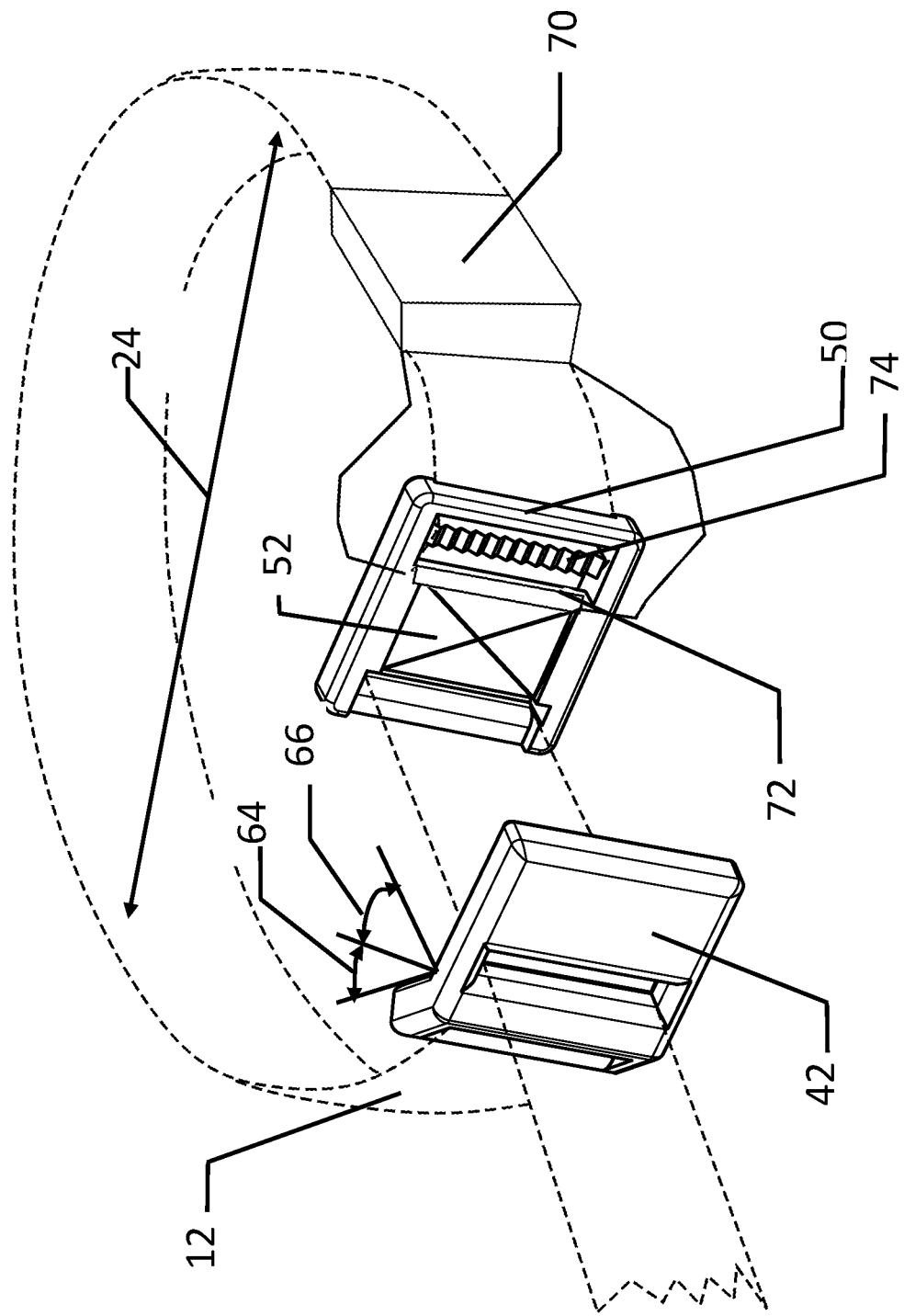
FIG. 3 shows the animal restraining clasp on a strap.
Figure 4:
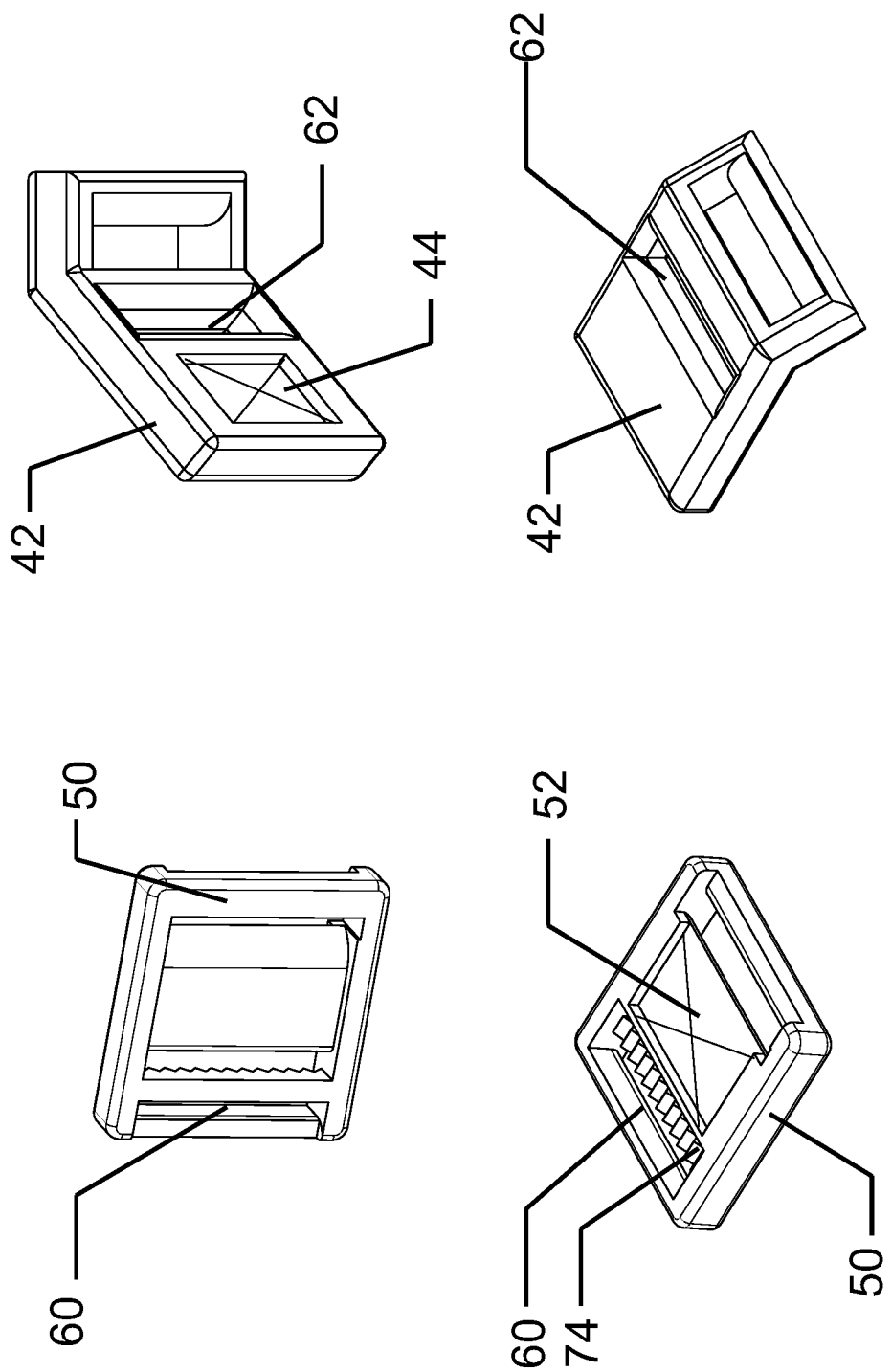
FIG. 4 shows views of the clasp distal and proximate portions and locking teeth.
Figure 5:
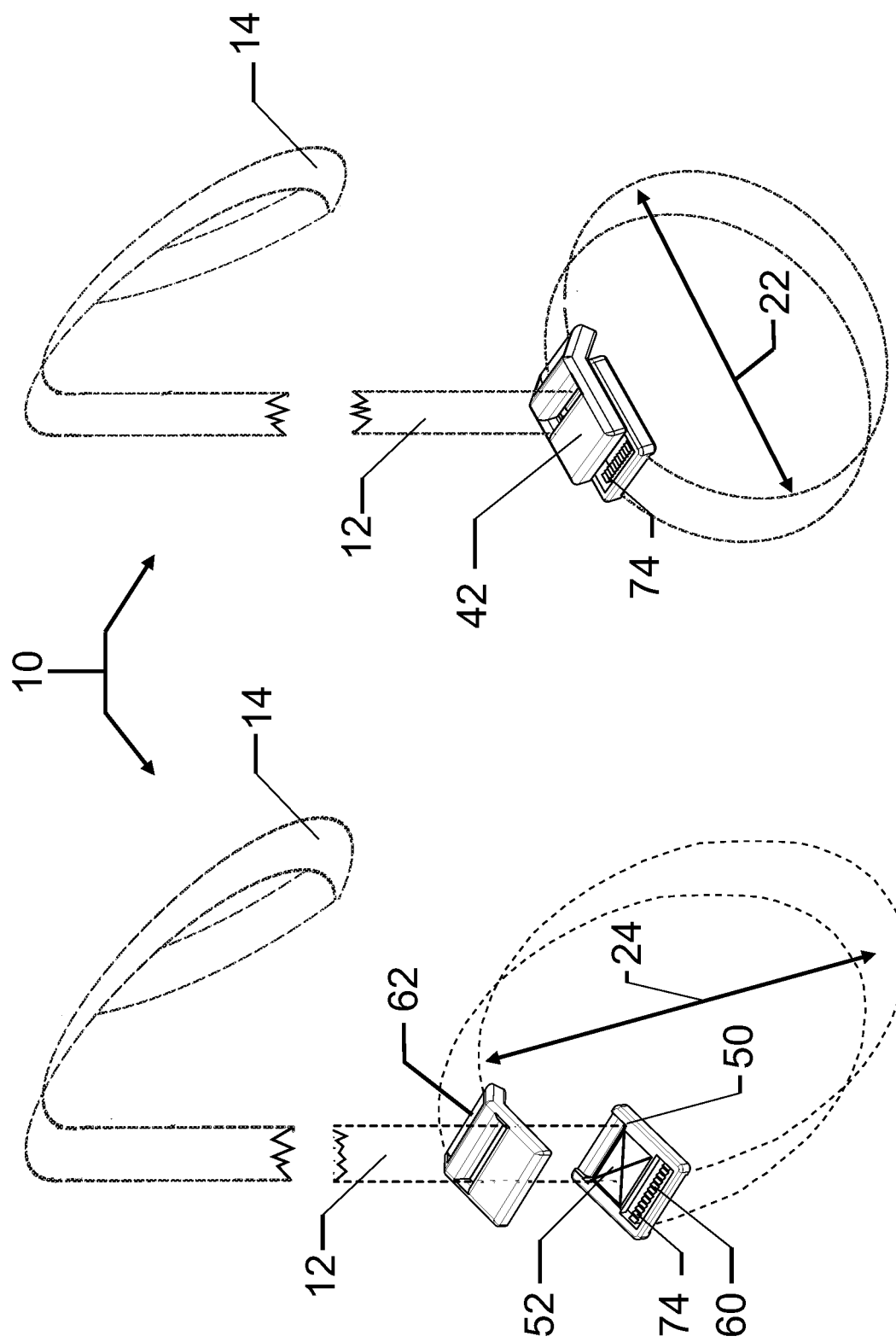
FIG. 5 shows the animal restraining clasp in coupled and decoupled positions.
Figure 6:
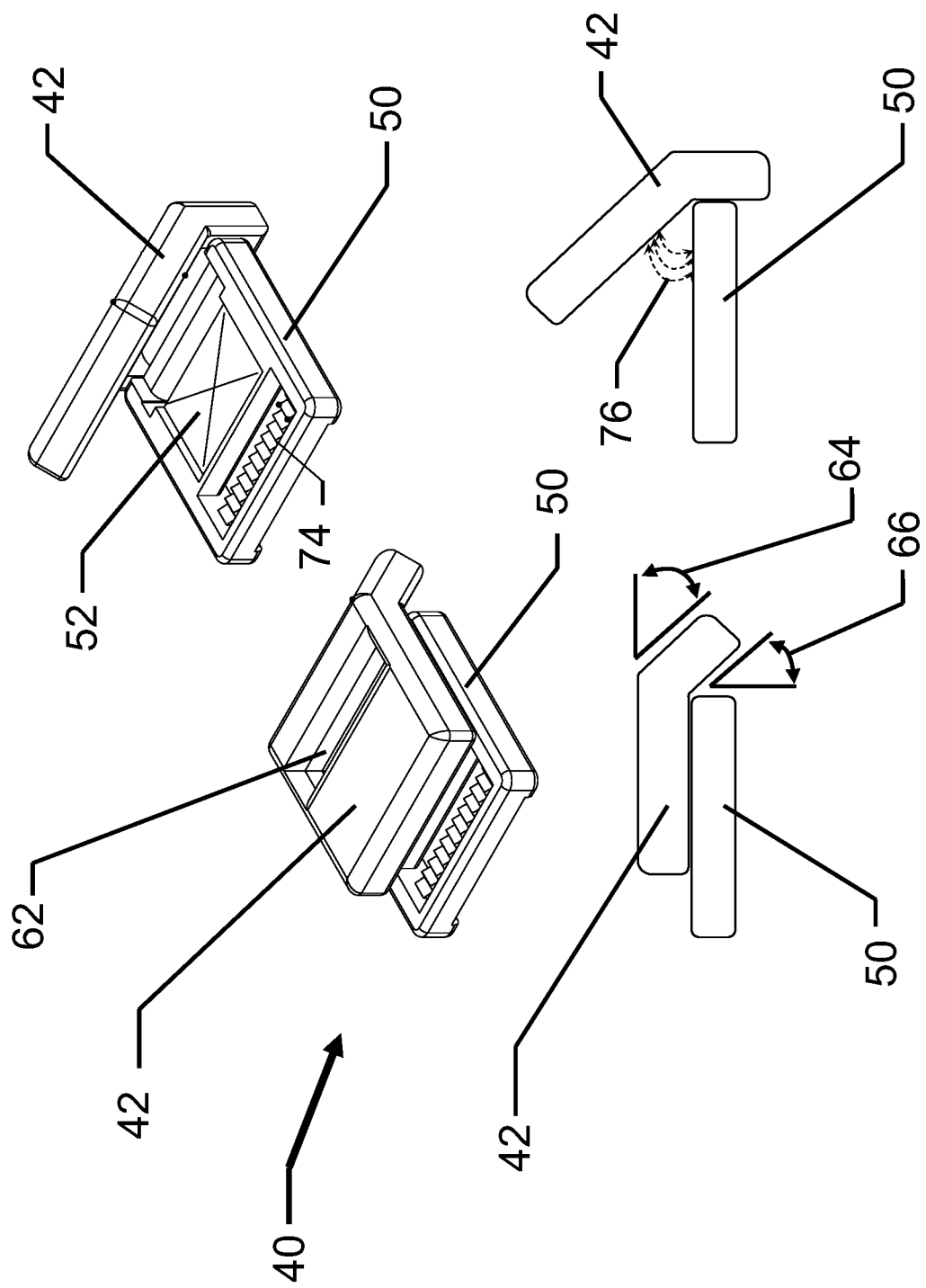
FIG. 6 shows more details on the pivoting motion of the animal restraining clasp.

An embodiment of the animal restraining clasp 40, as shown in FIGS. 1 thru 5, is disclosed as having a clasp distal portion 42 with a distal magnet 44, the clasp distal portion 42 being fixedly coupled to a strap distal end 46 and slidingly coupled to a strap proximate portion 48. A clasp proximate portion 50 is disclosed as having a proximate magnet 52, and the clasp proximate portion 50 is movably coupled to a strap distal portion 54. The clasp distal portion 42 sliding motion is limited to traversal of only the strap proximate portion 48. Applying tension to the strap 12 forces the clasp distal portion 42 sliding motion until physical engagement with the coupled clasp proximate portion 50 with subsequent magnetic engagement between the proximate magnet 52 and distal magnet 44, thereby magnetically coupling the clasp proximate portion 50 with the clasp distal portion 54.

The clasp proximate portion 50 and clasp distal portion 42 can have a clasp proximate body member 56 and clasp distal body member 58, that carry the proximate magnet 52 and distal magnet 44, respectively. A clasp proximate flange 60 and clasp distal flange 62 extend outwardly from each clasp body member. Each clasp flange 60, 62 has at least one slot therein to enable looping, locking, passage and engagement of the strap 12 in proper position. The clasp proximate flange 60 can also have teeth 74 disposed in at least one of the slots. The teeth 74 are oriented so that strap tension engages the teeth 74 with the strap 12 to lock the position and, in combination with friction, prevents movement of the clasp proximate portion 54 along the strap 12 in any direction. The clasp proximate portion 50 position is established to form and maintain the limited strap lasso diameter 22 which prevents animal choking.

A portion of the clasp distal flange 62 slants at an angle 64 to enable proper alignment for mating and magnetic coupling/decoupling of the proximate magnet 52 and distal magnet 44. The angle 64 can be in the range of 45 degrees to 60 degrees, and is set to retain a minimum magnetic attraction between the proximate magnet 52 and distal magnet 44 during pivoting action, thereby preventing the clasp distal portion 42 from physically decoupling from the clasp proximate portion 50. The portion of the clasp distal flange 62 that slants at an angle 64 travels through the gap 66, pivoting around the outer edge of the clasp proximate portion 50, until it stops at with the contact face of the clasp proximate portion 50.

The animal restraint and training device 10 can further have an optional signal device 70 configured to cause a training signal during coupling and decoupling of the proximate magnet 52 and distal magnet 44. The signal device 70 can have at least one switch 72, such as a mechanical, electrical, electronic, or magnetic switch, disposed near either the proximate magnet 52 or distal magnet 44. Upon magnetic coupling of the distal magnet 44 and proximate magnet 52, the normally open switch 72 is in the open position, which either silences the training signal or activates an audible 'proceed' or 'okay' command signal to the animal. When sufficient tension is applied to the strap proximate portion 48, the magnetic coupling decouples and the normally open switch 72 closes to complete the circuit to activate a 'slower' or 'heel' command signal. A high-pitched whistle, inaudible to humans, can also be used, as wells as any combination of the standard or custom training command signals. The signal device 70 can have a programmable non-transitory computer-readable storage medium configured with instructions executable by one or more processors to produce many training command signals, such as recorded owner voice commands.

The animal restraining clasp proximate portion 50 and clasp distal portion 42 can be made from at least one of a metallic material, a plastic material, a composite material, and an organic material such as wood.

An additional embodiment is an animal restraint and training device 10 which can have a strap 12 having a strap proximate portion 48 with a strap proximate end 14, and a strap distal portion 54 with a strap distal end 46. The animal restraint and training device 10 can have an animal restraining clasp 40 having a clasp distal portion 42 having a distal magnet 44, the clasp distal portion 42 can be fixedly coupled to a strap distal end 46 and slidingly coupled to a strap proximate portion 48. A clasp proximate portion 50 is disclosed as having a proximate magnet 52, and the clasp proximate portion 50 is movably coupled to a strap distal portion 54. The clasp distal portion 42 sliding motion is limited to traversal of only the strap proximate portion 48. Applying tension to the strap 12 forces the clasp distal portion 42 sliding motion until physical engagement with the coupled clasp proximate portion 50 with subsequent magnetic engagement between the proximate magnet 52 and distal magnet 44, thereby magnetically coupling the clasp proximate portion 50 with the clasp distal portion 54.

The clasp proximate portion 50 and clasp distal portion 42 can have a clasp proximate body member 56 and clasp distal body member 58, that carry the proximate magnet 52 and distal magnet 44, respectively. A clasp proximate flange 60 and clasp distal flange 62 extend outwardly from each clasp body member. Each clasp flange 60, 62 has at least one slot 64 thereon. A portion of the clasp distal flange 62 slants at an angle 64 to enable proper alignment for magnetic coupling and decoupling of the proximate magnet 52 and distal magnet 44.

The animal restraint and training device 10 can further have a clasp proximate flange 60 and clasp distal flange 62 extend outwardly from each clasp body member. Each clasp flange 60, 62 has at least one slot 64 thereon. A portion of the clasp distal flange 62 slants at an angle 64 to enable proper alignment for magnetic coupling and decoupling of the proximate magnet 52 and distal magnet 44. The strap proximate end 14 extends around the bar and through the slot of the clasp proximate portion 50. The distal strap end 46 extends around the bar and through the slot 64 of clasp distal portion 42.

Another embodiment of the animal restraining clasp 40 has only a single magnet disposed either as a distal magnet 44 or a proximate magnet 52. The opposing non-magnetic side of the clasp magnetic coupling can be a ferromagnetic metal, such as iron or steel, which will attract to the magnetic portion of the clasp and function in the same manner as the embodiment having dual magnets.

A method of restraining an animal 20 with a strap 12 and clasp 40 is disclosed involving the steps of: movably coupling a clasp proximate portion 50 to a strap distal portion 54 using teeth 74 to lock into a non-choking position, the non-choking position corresponding with a limited strap lasso diameter 22, wherein the strap distal portion 54 is defined as the strap portion disposed on the distal side of the clasp proximate portion 50 and the strap proximate portion 48 is defined as the strap portion disposed on the proximate side of the clasp proximate portion 50. Next, sliding the clasp distal portion 42 in the proximate direction thereby forming an expanded strap lasso diameter 24, the clasp distal portion 42 sliding motion is limited to traversal of only the strap proximate portion 48. Then, placing the expanded strap lasso diameter 24 over the head of an animal 20 or onto an animal 20 harness connection. By applying strap tension to the strap proximate portion 48, sliding motion of the clasp distal portion is forced in the distal direction to reduce the expanded strap lasso diameter 24 to a limited strap lasso diameter 22. The clasp 40 portions become physically engaged when the clasp distal portion 42 slides in contact with the clasp proximate portion 50, thereby magnetically coupling the clasp proximate portion 50 with the clasp distal portion 42 to maintain the clasp distal portion 42 position at the limited strap lasso diameter 22. A magnetic clasp coupling sound from a signal device 70, as sensed by a magnetic switch 72, can signal the animal 20 to proceed at this pace. The animal 20 is more humanely restrained at the limited strap lasso diameter 22 position by applying tension to the strap proximate portion 48 which avoids animal 20 choking. When applying additional tension to the strap proximate portion 48, a pivoting action is initiated wherein the clasp distal portion 42 pivots around the outer edge of the clasp proximate portion 48 to close the gap 66 and temporarily decouple the distal magnet 44 from the proximate magnet 52 while still maintaining a minimal magnetic attraction 76 between the proximate magnet 52 and distal magnet 44, thereby preventing the clasp distal portion 42 from physically decoupling from the clasp proximate portion 50. A magnetic clasp decoupling sound can be made by the signal device 70, as sensed by a switch 72, thereby signaling the animal 20 to slow their pace. Releasing strap tension on the strap proximate portion 48 pivots the clasp distal portion 42 toward the clasp proximate portion 48 to close the gap 66 and temporarily recouple the distal magnet 44 to the proximate magnet 52. A magnetic clasp coupling sound can be sent from the signal device 70 signaling the animal 20 to proceed at this pace. Releasing or freeing the animal 20 is by disengaging the magnetic coupling and sliding the clasp distal portion 42 in the proximate direction until the expanded strap lasso diameter 44 is sufficient to remove the strap from the animal 20 head or harness.

The method can further include the step of causing an training signal from the signal device 70 during coupling and decoupling of the magnetic coupling, wherein the audible training signal sounds a 'heel' command signal upon decoupling of the magnetic coupling, and an 'okay' command signal upon coupling of the magnetic coupling, and a high-pitched whistle inaudible to humans, as well as any combinations of the training signals.

The following documents are incorporated by reference in their entirety; US 2017/0127653 to Fang, US2016/0095298 to Bodrie, US 2013/0074782 to Marran, U.S. Pat. No. 8,967,086 to Palladino, U.S. Pat. No. 5,456,213 to Beauchamp, U.S. Pat. No. 4,787,340 to Kirtley, and U.S. Pat. No. 2,289,802 to Norton.

The invention has been described with reference to the preferred embodiments without limit thereto. One of skill in the art would realize additional embodiments and improvements which are not specifically stated but which are within the meets and bounds of the claims appended hereto.

The invention claimed is:
1. An animal restraining clasp, comprising;
   a clasp distal portion comprising a distal magnet, said clasp distal portion fixedly coupled to a leash distal end and slidingly coupled to a leash proximate portion;
   a mating clasp proximate portion comprising a proximate magnet, said clasp proximate portion movably coupled to a leash distal portion; and
   wherein said clasp distal portion sliding motion is limited to traversal of only said leash proximate portion until tension in the leash stops motion of the clasp distal portion upon physical engagement with the coupled clasp proximate portion and magnetic engagement between the proximate magnet and distal magnet, thereby magnetically coupling the clasp proximate portion with the clasp distal portion; and
   a signal device configured to cause a training signal during coupling and decoupling of the magnetic coupling; wherein the signal device comprises at least one switch disposed near the proximate and distal magnets and comprises of a programmable non-transitory computer-readable storage medium.

2. The clasp according to claim 1, wherein said clasp proximate portion and clasp distal portion each comprise a body member carrying said proximate and distal magnets.

3. The clasp according to claim 2, further comprising a flange extending outwardly from each said body member, each said flange having at least one slot thereon.

4. The clasp according to claim 1, wherein the training signal comprises at least one of an audible command signal upon decoupling of the magnetic coupling, an audible command signal upon coupling of the magnetic coupling, a high-pitched whistle inaudible to humans, and combinations thereof.

5. The clasp according to claim 1, wherein said clasp proximate portion and clasp distal portion comprise at least one of a metallic material, a plastic material, a composite material, and an organic material.

6. The clasp according to claim 1, wherein said proximate magnet comprises at least a portion of non-magnetic ferromagnetic metal.

7. An animal restraint and training device, comprising;
   a leash comprising a leash proximate portion with a leash proximate end, and a leash distal portion with a leash distal end;
   a clasp comprising;
      a clasp distal portion comprising a distal magnet, said clasp distal portion fixedly coupled to the leash distal end and slidingly coupled to the leash proximate portion;
      a mating clasp proximate portion comprising a proximate magnet, said clasp proximate portion movably coupled to the leash distal portion; and
      wherein said clasp distal portion sliding motion is limited to traversal of only said leash proximate portion until tension in the leash stops motion of the clasp distal portion upon physical engagement with the coupled clasp proximate portion and magnetic engagement between the proximate magnet and distal magnet, thereby magnetically coupling the clasp proximate portion with the clasp distal portion; and
      a signal device configured to cause a training signal during coupling and decoupling of the magnetic coupling; wherein the signal device comprises at least one switch disposed near the proximate and distal magnets and comprises of a programmable non-transitory computer-readable storage medium.

8. The animal restraint device according to claim 7, wherein said clasp proximate portion and clasp distal portion each comprise a body member carrying said proximate and distal magnets.

9. The animal restraint device according to claim 8, further comprising a flange extending outwardly from each said body member, each said flange having at least one slot therein creating a bar, at least one of the slots further comprising teeth, wherein said proximate leash end extends around said bar and through said at least one slot to engage the leash with the teeth and secure the clasp proximate portion position, and said distal leash end extending around said bar and through said slot of said distal portion.

10. The animal restraint device according to claim 7, wherein the training signal comprises at least one of an audible command signal upon decoupling of the magnetic coupling, an audible command signal upon coupling of the magnetic coupling, a high-pitched whistle inaudible to humans, and combinations thereof.

11. The animal restraint device according to claim 7, wherein said clasp proximate portion and clasp distal portion comprises at least one of a metallic material, a plastic material, a composite material, and an organic material.

* * * * *